(12) United States Patent
Blair (10) Patent No.: US 11,199,498 B2
(45) Date of Patent: *Dec. 14, 2021

(54) PORTABLE SPECTROMETER FOR THE PRESUMPTIVE IDENTIFICATION OF SUBSTANCES

(71) Applicant: University of Central Florida Research Foundation, Inc., Orlando, FL (US)

(72) Inventor: Richard George Blair, Ovledo, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 108 days.

This patent is subject to a terminal disclaimer.

(21) Appl. No.: 16/159,352

(22) Filed: Oct. 12, 2018

(65) Prior Publication Data

US 2020/0116633 A1   Apr. 16, 2020

Related U.S. Application Data

(63) Continuation of application No. 14/889,318, filed as application No. PCT/US2014/037483 on May 9, 2014, now Pat. No. 10,101,278.

(Continued)

(51) Int. Cl.
*G01N 21/64* (2006.01)
*G01N 21/25* (2006.01)

(52) U.S. Cl.
CPC ......... *G01N 21/645* (2013.01); *G01N 21/255* (2013.01); *G01N 21/6428* (2013.01); *G01N 2201/0221* (2013.01)

(58) Field of Classification Search
CPC ........ G01N 21/00; G01N 21/01; G01N 21/03; G01N 21/25; G01N 21/255;
(Continued)

(56) References Cited

U.S. PATENT DOCUMENTS 3,834,903 A   9/1974 Inoue
3,871,972 A   3/1975 Sekine
(Continued)

FOREIGN PATENT DOCUMENTS

DE           2226994           12/1973
WO   WO-2012045025 A1 *   4/2012  ........... G01N 21/718

OTHER PUBLICATIONS

Abdel-Gawad, Spectrophotometric determination of some pharmaceutical piperazine derivatives through charge-transfer and ion-pair complexation reactions, Journal of Pharmaceutical and Biomedical Analysis, 1997. 15(11): p. 1679-1685.
(Continued)

*Primary Examiner* — Anastasia Midkiff
(74) *Attorney, Agent, or Firm* — Dunlap Codding, P.C.

(57) ABSTRACT

A portable spectrometer system is disclosed for more reliable and convenient on-site drug testing. More particularly, but not by way of limitation, the presently disclosed and/or claimed inventive concept(s) relates to a portable spectrometer system having a test strip having a fluorescent indicator, a fluorimeter, and a mobile computing device capable of determining the identity of an unknown substance in the sample.

20 Claims, 9 Drawing Sheets

Related U.S. Application Data (60) Provisional application No. 61/821,472, filed on May 9, 2013.

(58) Field of Classification Search
CPC ............. G01N 21/6428; G01N 21/645; G01N 21/6456; G01N 2021/0106; G01N 2021/0112; G01N 2021/015; G01N 2021/0303; G01N 2201/02; G01N 2201/022; G01N 2201/0221
See application file for complete search history.

(56) References Cited

U.S. PATENT DOCUMENTS

| | | |
|---|---|---|
| 3,955,926 A | 5/1976 | Fischer |
| 3,996,053 A | 12/1976 | Martin |
| 4,337,065 A | 6/1982 | Hiratsuka |
| 4,668,359 A | 5/1987 | Postle |
| 4,833,088 A | 5/1989 | Desimone |
| 4,934,817 A | 6/1990 | Gassenhuber |
| 5,073,629 A | 12/1991 | Dubler |
| 5,158,849 A | 10/1992 | Katsen |
| 5,212,099 A | 5/1993 | Marcus |
| 5,445,967 A | 8/1995 | Deuter |
| 5,526,120 A | 6/1996 | Jina |
| 6,159,424 A | 12/2000 | Kauhaniemi |
| 6,295,506 B1 | 9/2001 | Heinonen |
| 6,306,283 B1 | 10/2001 | Brandt |
| 7,267,799 B1 | 9/2007 | Borich |
| 7,283,245 B2 | 10/2007 | Xiao |
| 7,420,663 B2 | 9/2008 | Wang |
| 8,145,431 B2 | 3/2012 | Kloepfer |
| 8,163,241 B2 | 4/2012 | Burke |
| 8,367,013 B2 | 2/2013 | Kaylor |
| 8,493,441 B2 | 7/2013 | Thonhauser |
| 8,743,194 B2 | 6/2014 | Fletcher |
| 8,885,161 B2 | 11/2014 | Scheeline |
| 8,889,424 B2 | 11/2014 | Ehrenkranz |
| 8,916,390 B2 | 12/2014 | Ozcan |
| 8,947,656 B2 | 2/2015 | Cunningham |
| 9,023,295 B2 | 5/2015 | Chumanov |
| 9,057,702 B2 | 6/2015 | Ozcan |
| 9,241,663 B2 | 1/2016 | Jena |
| 9,244,066 B2 | 1/2016 | O'Driscoll |
| 9,445,749 B2 | 9/2016 | Erickson |
| 9,489,703 B2 | 11/2016 | Kaunickangas |
| 9,759,733 B1 * | 9/2017 | Callahan ............ G01N 33/9486 |
| 10,101,278 B2 * | 10/2018 | Blair ..................... G01J 3/0291 |
| 2002/0058301 A1 | 5/2002 | Huh |
| 2003/0032077 A1 | 2/2003 | Itoh |
| 2003/0119202 A1 | 6/2003 | Kaylor |
| 2003/0151735 A1 | 8/2003 | Blumenfeld |
| 2005/0001144 A1 | 1/2005 | Cartlidge |
| 2005/0023439 A1 | 2/2005 | Cartlidge |
| 2005/0123439 A1 | 6/2005 | Patton |
| 2005/0157304 A1 | 7/2005 | Xiao |
| 2005/0201898 A1 | 9/2005 | Borich |
| 2006/0019408 A1 * | 1/2006 | Waggoner ............ G01N 33/582 436/518 |
| 2006/0036084 A1 * | 2/2006 | Qu ....................... C09K 11/565 534/7 |
| 2006/0222567 A1 * | 10/2006 | Kloepfer .............. G01N 33/558 422/68.1 |
| 2006/0279732 A1 * | 12/2006 | Wang ........................ G01J 3/02 356/326 |
| 2007/0275472 A1 | 11/2007 | Bertucci |
| 2008/0101986 A1 | 1/2008 | Saini et al. |
| 2009/0191092 A1 | 7/2009 | Burke |
| 2010/0285610 A1 | 11/2010 | Saul |
| 2011/0009163 A1 | 1/2011 | Fletcher et al. |
| 2011/0053283 A1 | 3/2011 | Hood |
| 2011/0054938 A1 | 3/2011 | Hood |
| 2011/0063433 A1 | 3/2011 | Thonhauser |
| 2012/0002852 A1 | 1/2012 | Karasikov |
| 2012/0157160 A1 | 6/2012 | Ozcan et al. |
| 2012/0286046 A1 | 11/2012 | Clurczak |
| 2012/0301528 A1 | 11/2012 | Uhlmann |
| 2013/0093936 A1 | 4/2013 | Scheeline |
| 2013/0157351 A1 | 6/2013 | Ozcan |
| 2013/0203043 A1 | 8/2013 | Ozcan |
| 2014/0002820 A1 | 1/2014 | Ko |
| 2014/0038222 A1 | 2/2014 | Alt |
| 2014/0072189 A1 | 3/2014 | Jena |
| 2014/0154152 A1 | 6/2014 | Chumanov |
| 2014/0193839 A1 | 7/2014 | Cunningham |
| 2014/0247340 A1 | 9/2014 | Kauniskangas |
| 2014/0296112 A1 | 10/2014 | O'Driscoll |
| 2014/0356978 A1 | 12/2014 | Jabour |
| 2016/0077091 A1 | 3/2016 | Tyrrell |
| 2016/0109371 A1 * | 4/2016 | Blair .................... G01N 21/645 436/172 |
| 2016/0231171 A1 * | 8/2016 | Assefa ....................... G01J 3/18 |
| 2016/0299061 A1 * | 10/2016 | Goldring .............. G01J 3/0275 |
| 2018/0143073 A1 * | 5/2018 | Goldring .............. G01J 3/0291 |
| 2018/0275152 A1 * | 9/2018 | Hall ...................... G01N 21/31 |

OTHER PUBLICATIONS

Andrew et al., A Fluorescence Turn-On Mechanism to Detect High Explosives RDX and PETN. J. Am. Chem. Soc., 2007. 129(23): p. 7254-7255.

Andryushechkin et al., Epitaxial Growth of Semiconductor Films in the Interaction of Metals with Halogens. Atomic structure of CuI on Cu (110). JETP Letters, 2006. 83(4): p. 162-166.

Argos et al., The Crystal and Molecular Structure of 1-(1-Phenylcyclohexyl) Piperidine Hydrochloride. Acta Cryst, 1970. B26: p. 53.

Barbieri et al., Luminescent complexes beyond the platinum group: the d10 avenue. Chem. Commun., 2008: p. 2185-2193.

Ciureanu et al., A spectroscopic study of iodine complexes with aromatic amines. Rev. Roum. Chim., 1979. 24(5): p. 655-61.

Csaszar, On the formation of aromatic secondary amine-iodine complexes. ACH—Models Chem., 1995. 132(5): p. 845-51.

Csaszar, et al., Formation and visible spectra of some molecular complexes of aliphatic and aromatic primary amines with iodine in chlorine-containing aliphatic solvents. Acta Phys. Chem., 1990. 36(1-4): p. 66-82.

Ford, et al., Photoluminescence Properties of Multinuclear Copper(I) Compounds. Chemical Reviews, 1999. 99(12): p. 3625-3648.

Hardt, et al., Fluoreszenznachweis von Kupferionen und Kupfermetall. Naturwissenschaften, 1973. 60: p. 200-201.

Hardt, et al., Fluorescence thermochromism of pyridine copper iodides and copper iodide. Zeitschrift f,r anorganische und allgemeine Chemie, 1973. 402(1): p. 107-112.

Hardt, H.D et al., Zeitschrift fur Analytishe Chemie, 1973, 265, 337-339.

Hunt, R.W.G. and M.R. Pointer, Appendix 8: Illuminant-Observer Weights for Calculating Tristimulus Values, in Measuring Colour. 2011, John Wiley & Sons, Ltd. p. 393-429.

Hunt, R.W.G., Measuring Color. 2nd ed. 1999, Tolworth, UK: Fountain Press.

Jiang, et al., Crystal structure of tetra-m3-iodo-tetrakis[(nicotine)copper(I)], Cu4I4(C10H14N2)4 Z. Kristallogr. NCS, 2009. 224(3): p. 466-468.

Kitagawa, et al., Flexibility of cubane-like Cu4I4 framework: temperature dependence of molecular structure and luminescence thermochromism of [Cu4I4(PPh3)4] in two polymorphic crystalline states. Chemical Communications, 2010. 46(34): p. 6302-6304.

Kyle et al., Photophysical studies in solution of the tetranuclear copper(I) clusters Cu4I4L4 (L=pyridine or substituted pyridine). Journal of the American Chemical Society, 1991. 113(8): p. 2954-2965.

Lainton et al., 1-Alkyl-3-(1-naphthoyl)pyrroles: a new class of cannabinoid. Tetrahedron Lett., 1995. 36(9): p. 1401-4.

Lindbloom,http://www.brucelindbloom.com/index.htm?ColorCalculator. html. 2009.

Logan, et al., 3,4-methoxymethamphetamine (MDMA, Ecstasy) and driving impairment. J Forens Sci, 2001. 46(6): p. 154-161.

(56) References Cited

OTHER PUBLICATIONS

Lopez-Delgado et al., Fluorescence properties of methyl salicylate in vapor, liquid, and solution. The Journal of Physical Chemistry, 1981. 85(7): p. 763-768.
Marcotrigiano et al., Adducts of Piperidine, Piperazine, Methylpiperazine, and Morpholine with Bis(β-Ketoenolates) of Nickel(II). Can. J. Chem., 1972. 50(16): p. 2557-2560.
Muñoz et al., FTIR and fluorescence studies on the ground and excited state hydrogen-bonding interactions between 1-methylindole and water in water-triethylamine mixtures. Chemical Physics, 2007. 335(1): p. 43-48.
NCBI, 1-benzylpiperazine—Compound Summary (CID 75994), in http://pubchem.ncbi.nlm.nih.gov/summary/summary.cgi?cid=75994 &loc=ec_rcs. 2011.
O'Neal et al., Validation of twelve chemical spot tests for the detection of drug abuse. Forensic Science International, 2000, 109, 189-201.
USPTO, Final Rejection for U.S. Appl. No. 14/889,318, dated Aug. 7, 2017.
USPTO, Office Action regarding U.S. Appl. No. 14/889,318, dated Jan. 6, 2017.
Abdel-Gawad, Spectrophotometric determination of some pharmaceutical piperazine derivatives through charge-transfer and ion-pair complexation reactions, Journal of Pharmaceutical and Biomedical Analysis, 1992. 15(11); p. 1679-1685.
Andrew et al. A Fluorescene Turn-on Mechanism to Detect High Explosives RDX and PETN. J. Am. Chem. Soc. 2007. 129 (23) p. 7254-7255.
Andyryushechkin et al., Epitaxial Growth of Semiconductor Films in the Interaction of Metals with Halogens. Atomic Structure of CuI on Cu (110). JETP Letters, 2006. 83(4)4: p. 162-166.
Argos et al., The Crystal and Molecular Structure of 1-(1-Phenlycyclohexyl) Pipeline Hydrochloride. Acta Cryst, 1970. B26: p. 53.
Baoqiang et al., "A simple strategy for pyridine visual sensing by the in-situ formation of tetranuclear copper iodine pyridine microcrystal line film on copper foil", Thin Solid Films, Apr. 10, 2008, vol. 516, No. 21, pp. 7812-7815.
Barbieri et al., Luminescent complexes beyond the platinum group: the d10 avenune, Chem. Commun., 2008: p. 2185-2193.
Bizcardreader, http://bizcardreader.com/. 2010.
Ciureanu et al., A spectroscopic study of iodine complexes with aromatic amines. Rev. Roum. Chim., 1979. 24(5): p. 655-661.
Cole, M., Poison in party pills is too much to swallow, Nature, 2011, 474, 253.
Cone et al., Structure-activity relationship studies of phencyclidine derivatives in rats. Journal of Pharmacology and Experimental Therapeutics, 1984. 228(1): p. 147-153.
Cooper et al., A Note on the Crystal Structure of Marshite. The Canadian Mineralogist, 1997. 35: p. 785-786.
Csaszar, On the formation of aromatic secondary amine-iodine complexes. ACH—Models Chem, 1995. 132(5): p. 845-851.
Csaszar, et al., Formation and visible spectra of some melecular complexes of aliphatic and aromatic primary amines with iodine in chlorine-containing aliphatic solvents. Acta Phys. Chem., 1990. 36(1-4): p. 66-82.
David, W.S., Free radicals in alkaloidal color identification tests. Journal of Pharmaceutical Sciences, 1964. 53(8): p. 909-913.
Ding, et al., Geometry and Stability of CunN (n=1-6) and Cu3nNn (n=1-5) Clusters. J. Chem. Phys., 2009. 131: p. 174102.
Drug Enforcement Administration, Drug & Chemical Evaluation Section, Jul. 2012.
Extremetech., http://www.extremetech.com/article2/0,2845,1156000,00.asp. 2010.
Ford, et al., Photoluminescene Properties of Multinuclear Copper(I) Compounds. Chemical Reviews, 1999. 99(12): p. 3625-3648.
Hardt, et al., Fluorescence thermo chromism of copper(I) compounds. Naturwissenschaften, 1972. 59(8): p. 363.
Hardt et al., Floreszensnachweis von Kupferionen and Kupfermetall. Naturwissenschaften. 1973. 60: p. 200-201.

Hardt, et al. Flourescence thermochromism of pyridine copper iodides and copper iodide. Zeitschriftf,r anorganische und allegemeine Chemie, 1973. 402(1): p. 107-112.
Hardt, et al, Lumineszenzthermochromie, ein vergessenes Phanomen. Naturwissenschaften, 1973. 61: p. 107-110.
Hardt, H.D et al., Zeitschrif fur Analytishe Chemie, 1973, 265, 337-339.
Harvey et al., Luminescent Coordination Polymers Built Upon Cu4x4 (X=Br,I) Clusters and Mono- and Dithioethers. Macromolecular Rapid Communications, 2010. 31(9-10): p. 808-826.
Horvath, Photochemistry of copper(I) complexes. Coordination Chemistry Reviews, 1994. 135-136 p. 303-324.
Huffman et al., Design, Synthesis and Pharmacology of Cannabimimetic Indoles. Bioorganic & Medicinal Chemistry Letters, 1994. 4(4): p. 563-566.
Hunt, R.W.G. and M.R. Pointer, Appendix 8: Illuminant-Observer Weights for Calculating Tristmulus Values, in Measuring Colour. 2011, John Wiley & Sons, Ltd. p. 393-429.
Hunt, R.W.G. and M.R. Pointer, Obtaining Spectral Data and Tristmulus Values, in Measuring Colour. 2011 John Wiley & sons, Ltd. p. 99-115.
Jiang, et al., Crystal structure of tetra-m3-iodo-tetrakis[(nicotine)copper(I)]. Cu4I4(C1 OH14N2)4 Z. Kristallogr. NCS, 2009. 224(3): p. 466-468.
Kitagawa, et al., Flexibility of cubane-like Cu4I4 framework: temperature dependence of melecular structure and luminescene thermochromism of [Cu4I4(PPh3)4) in two polymorphic crystalline states. Chemical Communications, 2010. 46(34): p. 6302-6304.
Kunkely et al. Luminescence detection and photodimerization of 1,3- dimethyluracil coordinated to copper(I). Z. Naturforsch, B Chem. Sci., 2000 55(5): p. 386-388.
Kurt Al, Spectroscopic and photochemical properties of d10 metal complexes, Coordination Chemistry Reviews, 1990. 99. p. 213-252.
Kyle et al., Photophysical studies in solution of the tetranuclear copper(I) clusters Cu4I4L4 (L=pyridine or substituted pyridine). Journal of the American Chemical Society, 1991. 113(8): p. 2954-2965.
Lanton et al., 1-Alkyl-3-(1-naphthotyl) pyrroles: a new class of cannabinoid. Tetrahedon Left, 1995. 36(9): p. 1401-1404.
Lim et al., Copper (I) Cyanide Networks: Synthesis, Structure, and Luminescence Behavior. Part 2. Piperazine Ligands and Hexamethylenetetramine(1). Inorganic Chemistry, 2008. 47(15): p. 6931-6947.
Lindbloom, http://www.brucelindbloom.com/index.html?ColorCalculator.html.2009.
Logan et al., 3,4-methoxymethamphetamine (MOMA, Ecstasy) and driving impairment. J Forens Sci, 2001. 46(6) p. 154-161.
Lopez-Delgado et al., Fluorescence properties of methyl salicylate in vapor, liquid, and solution. The Journal of Physical Chemistry.
Marcotrigiano et al., Adducts of Piperidine, Piperazine, Methylpiperazine, and Morpholine with Bis(P-Ketoneolates) of Nickel(II). Can . J. Chem., 1972. 50(16): p. 2557-2560.
Munoz et al., FTIR and fluorescence studies on the ground and excited state hydrogen-bonding interactions between 1-methylindole and water in water-triethylamine mixtures. Chemical Phsyics, 2007. 335(1): p. 43-48.
NCBI, 1-benzylpiperazine—Compound Summary—(CID 75994), in http://pubchem.ncbi.nlm.nih.gov/summary/summary. cgi?cid=75994&1oc=_rcs. 2011.
NCBI, Phencyclidine—Compound Summary (CID 6468), in http://pubchem.ncbi.nlm.nih.gov/summary/summary.cgi?cid=6468. 2011.
NIH, http://rsbweb.nih.gov/ij/index.html. 2010.
O'Neal et al. Validation of twelve chemical spot test for the detection of drug abuse. Forensic Science International, 2000. 109, 189-201.
Peat, Analytical and Technical Aspects of Testing for Drug abuse: Confirmatory Procedures. Clinical Chemistry, 1988, 34(3), 471-473.
Perera et al., Recombination processes in dye-sensitized solid state-solar cells with CuI as the hole collector. Solar Energy Materials and Solar Cells, 2003. 79(2): p. 249-255.
Rinde et al., Colorimetric assay for aromatic amines. Analytical Chemistry, 1976. 48(3): p. 542-544.

(56) References Cited

OTHER PUBLICATIONS

Rizk, et al., Spectrophotometric Determination of Piperazine via Charge-transfer Complexes. Analyst, 1981. 106: p. 1163-1167.

* cited by examiner

PORTABLE SPECTROMETER FOR THE PRESUMPTIVE IDENTIFICATION OF SUBSTANCES

CROSS-REFERENCE TO RELATED APPLICATIONS/INCORPORATION BY REFERENCE STATEMENT

The present application is a continuation of U.S. application Ser. No. 14/889,318, filed Nov. 5, 2015 which is a national stage application filed under 35 U.S.C. § 371 of International Application No. PCT/US14/37483, filed May 9, 2014, which claims benefit under 35 U.S.C. § 119(e) of U.S. Provisional Patent Application Ser. No. 61/821,472, filed May 9, 2013, the entire contents all of which are hereby expressly incorporated herein by reference.

STATEMENT REGARDING FEDERALLY SPONSORED RESEARCH OR DEVELOPMENT

A portion of this work was sponsored by National Institute of Justice Award Number 2012-R2-CX-K005. The U.S. Government therefore has certain rights in the invention.

BACKGROUND

The problem faced by the drug analysts in the forensics community is the difficulty in identifying certain types of controlled substances. The frequency of new drugs introduced in the party environment is at an alarming rate and this enhances the problem faced by the drug analysts. One such drug hard to identify is benzylpiperazine (BZP), commonly known as Legal X. Currently, there are no presumptive tests available for BZP. Additionally, phenylcyclidine (PCP) and cocaine cannot be distinguished from each other using the conventional presumptive methods. Problems like these can lead to false positives or negatives for a certain drug because of the indistinguishable presumptive results.

There are many reagent kits that exist which are used to presumptively identify the drugs based on the color they yield. Different tests are used to identify certain drugs. For example, Marquis' reagent, a solution of formaldehyde and sulfuric acid, is used to identify MDMA (ecstasy) and some other opiates while a cobalt thiocyanate test is used to detect the presence of cocaine. These reagents are added to an unknown drug and react with it to result in a change of color. The resulting color will correspond to a specific drug. The problem that presents itself is that the results depend on the perception of color by the officers or agents using the kits and their ability to compare the result to those in a given list of drugs and their resultant color. In addition, some of the results give a range of colors (i.e. "strong reddish orange to deep reddish brown" or "olive green to yellow"), which make it even more difficult for a consensus presumption of the identity of the drug. In short, this method has a relatively high rate of false positives and false negatives. In the case of the cobalt thiocyanate test, diphenhydramine (e.g., Benadryl®, available from McNeil Consumer Healthcare, Fort Washington, Pa.) yields results similar to cocaine. Confirmatory testing of these unknown substances can be done by methods such as TLC and GC-MS. However, these methods are time consuming as most of the GC-MS samples are done in situ. Portable GC-MS devices do exist, but the major drawback is that they need properly trained officers or agents to use them and the equipment is expensive.

The idea of an easy-to-use, low cost and portable device to identify unknown drugs is very attractive in the forensics community. Thus, there is a need for a low cost and portable device that can presumptively identify illicit drugs and common substances of abuse. It is to such a low cost and portable device that the present disclosure is directed.

BRIEF DESCRIPTION OF THE SEVERAL VIEWS OF THE DRAWINGS

The accompanying drawings, which are incorporated in and constitute a part of this specification, illustrate one or more implementations described herein and, together with the description, explain these implementations. In the drawings.

DETAILED DESCRIPTION OF THE PRESENTLY DISCLOSED AND CLAIMED INVENTION

Before explaining at least one embodiment of the invention in detail, it is to be understood that the invention is not limited in its application to the details of construction, experiments, exemplary data, and/or the arrangement of the components set forth in the following description or illustrated in the drawings.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In one embodiment, the present disclosure describes a portable spectrometer system that includes a camera of a smart phone to obtain an emission spectrum of an unknown sample. Copper(I) iodide and other $d^{10}$ metal salts can be used to form luminescent cluster compounds with amines, such as alkaloids and opiates, that can be used to identify unknown substances on the fly. When $d^{10}$ metals are in solution with an amine present, a polynuclear cluster compound is formed. CuI is known to form a $Cu_4I_4L_4$, in which L is a ligand coordinated to the copper via its nitrogen (for amines) or phosphorus (for phosphines). (See, e.g., Ryu, C. K., et al., Iorg. Chem., 1993, 32, 869-874). For the purpose of directly testing an unknown substance, CuI can be used to test for amines in the form of alkaloids, opiates, and other drugs that have amine groups.

The $d^{10}$ metal salt can be a compound comprising a metal with an electronic configuration of $d^{10}$ and an anion selected from the group consisting of group 17 elements (i.e., halogens), cyanide ($CN^-$), thiocyanate ($SCN^-$), and combinations thereof. In one embodiment, the $d^{10}$ metal salt can be selected from the group consisting of copper (I) iodide, copper (I) bromide, silver (I) iodide, silver (I) bromide, gold (I) bromide, gold (I) iodide, zinc iodide, zinc bromide, cadmium iodide, cadmium bromide, mercury (I) iodide, mercury (I) bromide, and combinations thereof. Further, when referring to a $d^{10}$ metal it is meant any metal whose ten outer most electrons are in the 'd' orbitals such that the electron configuration is $d^{10}$.

In one non-limiting embodiment, an unknown sample is applied to a test strip (piece of filter paper coated with, for example but without limitation, CuI) forming a cluster compound that emits luminescence under UV radiation. In this embodiment, the portable spectrometer system uses an LED excitation source that emits at 254 nm. A smart phone application is stored within a non-transitory computer readable medium, such as memory within the smart phone. The smart phone application can be executed by one or more processors of the smart phone to analyze the luminescence emission of the resulting cluster compound on the test strip and ultimately obtain the emission spectrum of the sample. The portable spectrometer system may also include a library database that contains the spectral information for common drugs. By comparing the emission spectrum of the sample (as preferably represented by pixel values within an image) with the entries in the library database, the identification of the unknown sample can be rapidly determined on-site. The library database can be stored on the smart phone, or hosted remotely by a remote host system that the smart phone accesses via a wireless network. Although disclosed as a piece of filter paper in the above-recited embodiment, the test strip can be any substrate that does not fluoresce when subjected to short and long wave ultraviolet radiation.

In another embodiment, the test strip comprises a $d^{10}$ metal salt as described above and a polymer selected from the group consisting of polyvinylpyrrolidone, polyvinyl alcohol, and combinations thereof. It has been found that the combination of a $d^{10}$ metal salt and a polymer like, for example, polyvinylpyrrolidone, can form a film and/or coating on a substrate that produces good emission spectrums and has the consistency of a paint-like composition prior to drying. The test strip comprising the above-described $d^{10}$ metal salt and polymer selected from the group consisting of polyvinylpyrrolidone, polyvinyl alcohol, and combinations thereof can be formed by adding the above-described $d^{10}$ salt to an aqueous solution comprising the above-described polymer and allowing the solution to dry. In one embodiment, the test strip comprising the above-described $d^{10}$ metal salt and polymer selected from the group consisting of polyvinylpyrrolidone, polyvinyl alcohol, and combinations thereof can be a film independent of a substrate. In another embodiment, the test strip comprising the above-described $d^{10}$ metal salt and polymer selected from the group consisting of polyvinylpyrrolidone, polyvinyl alcohol, and combinations thereof can be a coating on a substrate.

Figure 1:
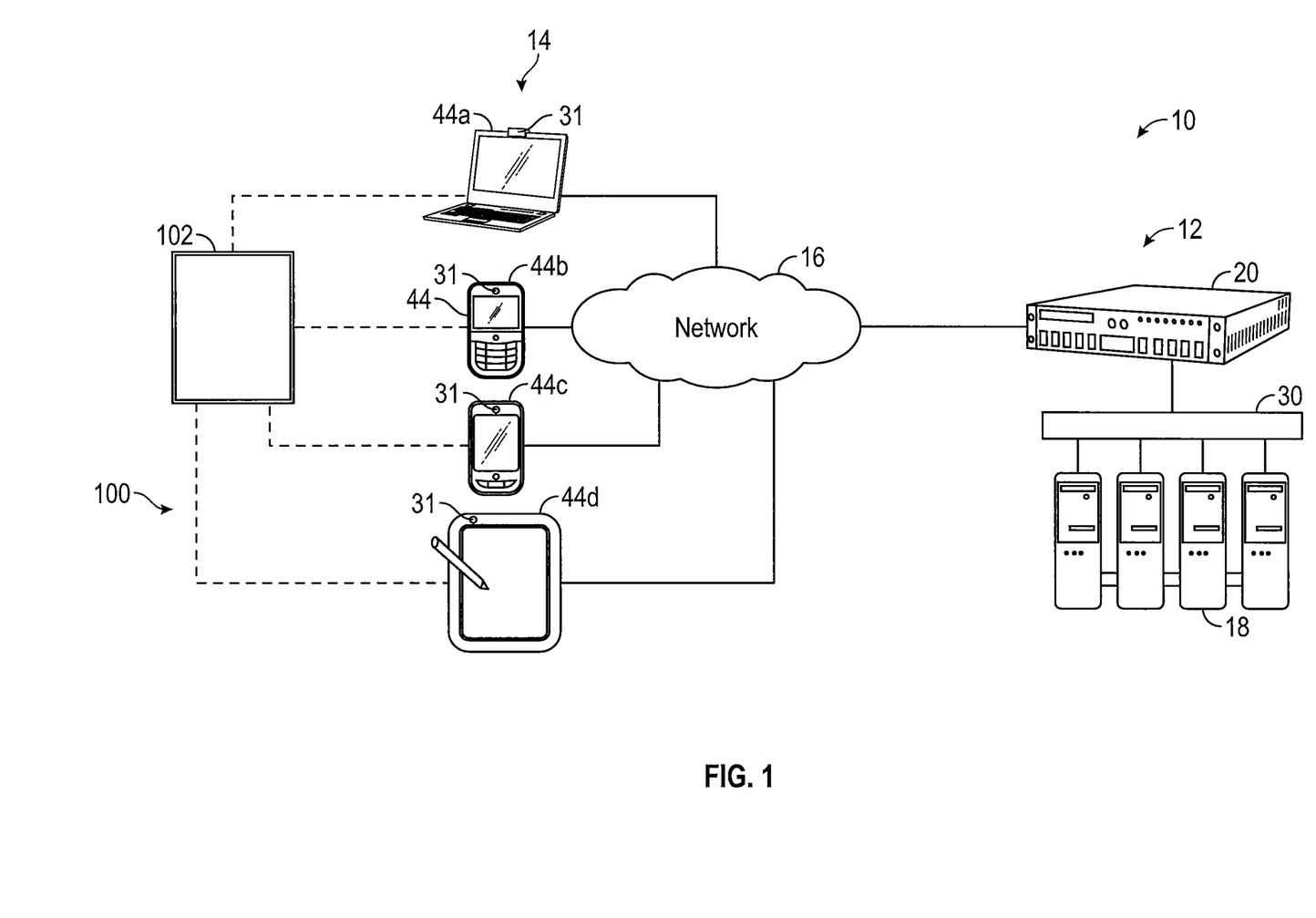
FIG. 1 is a schematic diagram of hardware forming an exemplary embodiment of a portable spectrometer system constructed in accordance with the present invention for analyzing an emission to determine an identity of an unknown substance.

Referring now to the drawings, and in particular to FIG. 1, shown therein and designated by a reference numeral 10 is an exemplary portable spectrometer system constructed in accordance with the present invention.

Preferably, the portable spectrometer system 10 is distributed, and includes a host system 12, communicating with one or more user devices 14 via a network 16. The network 16 can be the Internet or other network. In either case, the host system 12 typically includes one or more servers 18 configured to communicate with the network 16 via one or more gateways 20. When the network 16 is the Internet, the primary user interface of the portable spectrometer system 10 is delivered through a series of web pages, but the primary user interface can be replaced by another type of interface, such as a Windows-based application, or a mobile device application (hereafter referred to as an "App").

The network 16 can be almost any type of network although Internet and Internet 2 networks are preferred because of the wide support of their underlying technologies. The preferred embodiment of the network 16 exists in an Internet environment, which means a TCP/IP-based network. It is conceivable that in the near future, the preferred or other embodiments may wish to use more advanced networking topologies.

The servers 18 can be networked with a LAN 30. The gateway 20 is an entity responsible for providing access between the LAN 30 and the network 16. The gateway 20 can also be used as a security means to protect the LAN 30 from attack from external networks such as the network 16.

The LAN 30 network can be based on a TCP/IP network such as the Internet, or it can be based on another underlying network transport technology. The preferred embodiment uses an Ethernet network with TCP/IP because of the availability and acceptance of underlying technologies, but other embodiments may use other types of networks such as Fibre Channel, SCSI, Gigabit Ethernet, etc.

As discussed above, in one preferred embodiment, the host system 12 includes the servers 18. The configuration of the server hardware will depend greatly upon the requirements and needs of the particular embodiment of the portable spectrometer system 10. Typical embodiments, including the preferred embodiment, will include multiple servers 18 with load balancing to increase stability and availability.

It is envisioned that the servers 18 will include database servers and application/web servers. The database servers are preferably separated from the application/web servers to improve availability and also to provide the database servers with improved hardware and storage.

The user devices 14 can be any number and type of devices comprising an optical sensor 31, such as a camera, and a processor (not shown). The user devices 14 can be implemented as a portable device such as a mobile computing device 44 (for example, illustrated as 44a through 44d in FIG. 1). Nonexclusive examples of mobile computing device 44 include a laptop computer 44a (or handheld computer); a cellular telephone 44b such as a "smart phone" with a micro or embedded Web Browser; a Portable Digital Assistant 44c (PDA) capable of wireless network access; a pen-based or tablet computer 44d. Current embodiments of portable spectrometer system 10 can also be modified to use any of these or future developed devices.

In another example, the user device 14 may involve a user, using a computer with a display, keyboard, and mouse. The user device 14 may use a type of software called a "browser" to render HTML/XHTML content that is generated when requesting resources from a source, such as the host system 12. In the preferred embodiment, the portable spectrometer system 10 is designed to be compatible with major Web Browser vendors (for example, Microsoft Internet Explorer, Netscape Navigator, and Opera). Other embodiments may wish to focus on one particular browser depending upon the common user base using the portable spectrometer system 10.

The portable spectrometer system 10 is designed in this way as to provide flexibility in its deployment. Depending upon the requirements of the particular embodiment, the portable spectrometer system 10 could be designed to work in almost any environment such as a desktop application, a web application, or even simply as a series of web services designed to communicate with an external application.

Although some specifics for software and hardware components may be mentioned herein, it will be understood that a wide array of different components could be substituted, such as using different database vendors or even replacing the databases with XML-based document stores.

When the portable spectrometer system 10 is used to execute the logic of the processes described herein, such computer(s) and/or execution can be conducted at a same geographic location or multiple different geographic locations. Furthermore, the execution of the logic can be conducted continuously or at multiple discrete times.

The portable spectrometer system 10 includes one or more computer readable medium adapted to store instructions and/or data. The computer readable medium can be a part of the host system 12, the user devices 14 or combinations thereof.

Figure 2:
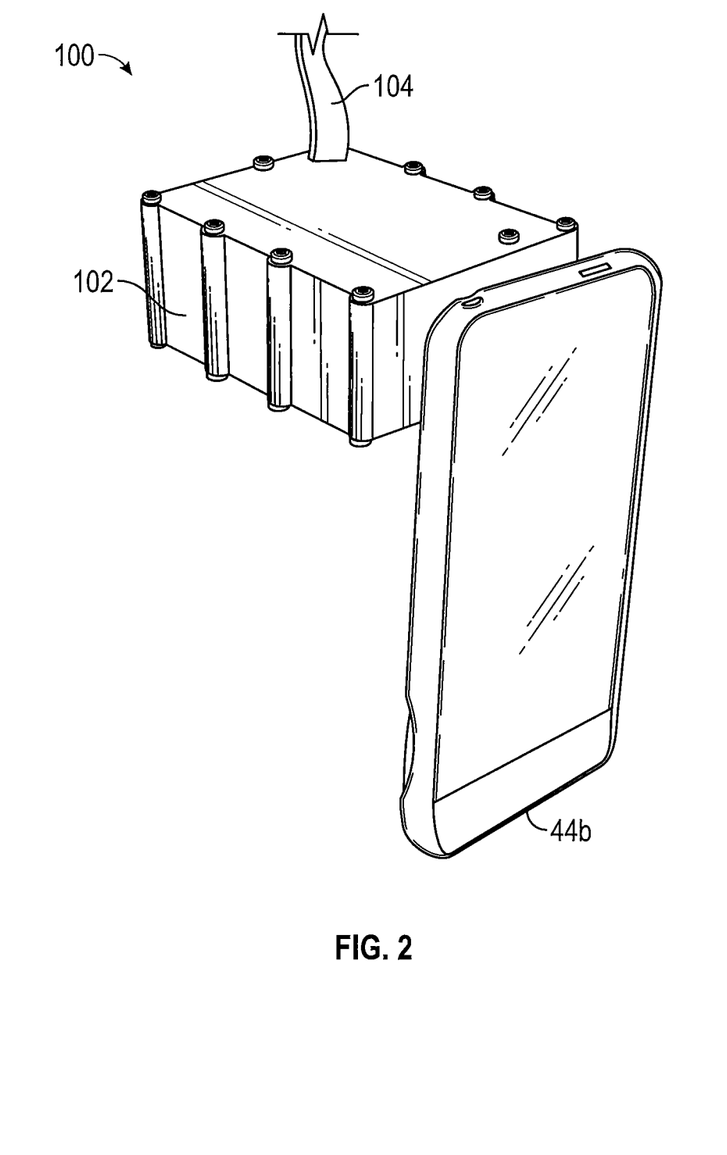
FIG. 2 is a pictorial representation of a mobile computing device, for example, a cellular telephone, and a fluorimeter of the portable spectrometer system generating and collecting an emission spectrum of a test strip with an unknown substance in accordance with the present invention.

The portable spectrometer system 10 includes one or more portable spectrometers 100 comprising a fluorimeter 102 working in conjunction with the mobile computing device 44 (illustrated, for example, as 44a-44d in FIG. 1) to analyze an unknown substance on a test strip 104 (not shown in FIG. 1). FIG. 2 is a pictorial representation of an exemplary portable spectrometer 100 with an exemplary mobile computing device, for example, a cellular telephone 44b, and fluorimeter 102 generating and collecting an emission spectrum of a test strip 104 with an unknown substance in accordance with the present disclosure. It should be recognized by a person of ordinary skill in the art that the mobile computing device should not be limited to a cellular telephone and instead can apply to any mobile computing device comprising an optical sensor 31 and a processor, e.g., a laptop computer 44a, PDA 44c, or a tablet computer 44d as illustrated in FIG. 1.

Figure 3:
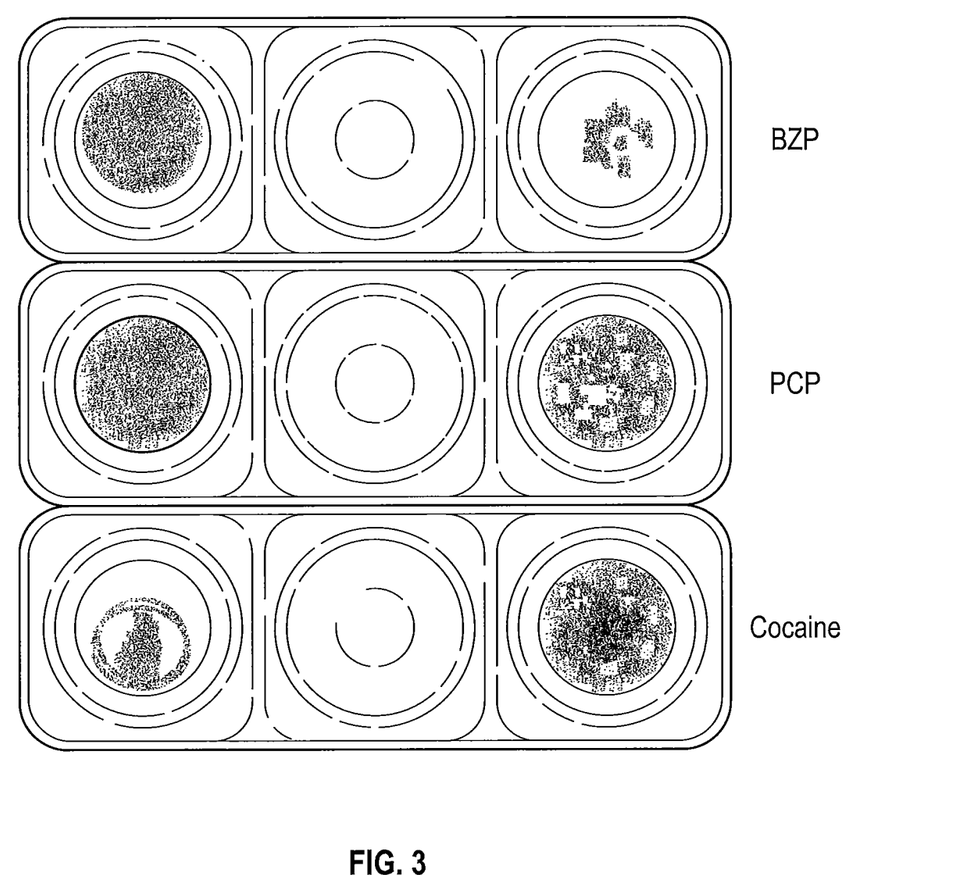
FIG. 3 is a photograph of emissions caused by different substances with a luminescent cluster compound being stimulated by UV radiation in accordance with the presently disclosed inventive concepts.

The test strip 104 may have a fluorescent indicator and be adapted to receive a sample of the unknown substance. When $d^{10}$ metals are in solution with an amine present, a polynuclear cluster compound is formed. CuI is known to form a $Cu_4I_4L_4$, in which L is a ligand coordinated to the copper via its nitrogen (for amines) or phosphorus (for phosphines). For the purpose of directly testing an unknown substance, the CuI may be utilized to test for amines in the form of alkaloids, opiates, and other drugs that have amine groups. For example, FIG. 3 is a photograph of emissions caused by different substances with a luminescent cluster compound being stimulated by UV radiation in accordance with the presently disclosed inventive concepts. An unknown sample is applied to the test strip 104 (for example, a piece of filter paper coated with CuI) forming a cluster compound that emits luminescence under UV radiation.

In an exemplary embodiment, the test strips 104 may be made with Whatman filter paper. The paper may be cut into 1 cm wide×2 cm long strips, for example, or in any size so as to fit into the fluorimeter 102 of the portable spectrometer 100. In one embodiment, a saturated solution of copper(I) iodide in acetonitrile is made and the strips of filter paper are dipped into the solution and then dried, wherein the acetonitrile evaporates. This process coats the test strips 104 with layers of CuI crystal on the surface. The coating for copper (I) iodide, as disclosed in the above-recited embodiment, and for any of the above-described $d^{10}$ metal salts has a thickness in a range from about 1 μm to about 1 mm. Additionally, although acetonitrile is disclosed in this particular embodiment, the solvent can comprise any weakly coordinating nitrogen-containing solvent including, for example but without limitation, amides, nitriles, and combinations thereof. With the CuI on the filter paper, the test strips 104 are ready to detect the amines. The sample of the unknown substance can be applied to the test strips 104 in different ways. One way is to simply apply the unknown substance, whether solid or liquid, onto the test strip 104 and then add a drop of solvent, such as acetonitrile. The solvent, as recited above, can comprise any weakly coordinating nitrogen-containing solvent. For example, but without limitation, the solvent can comprise a solvent selected from the group consisting of amides, nitriles, and combinations thereof. Or more specifically, the solvent can comprise for example but without limitation, acetonitrile, formamide, or combinations thereof. The addition of the solvent allows for cluster formation on the surface of the test strip 104. Another way the substance can be applied is to make a saturated solution of the substance in the solvent acetonitrile then dip the test strip 104 in the solution in the same manner as when the test strips 104 are dipped in the CuI. The latter method tends to give a more consistent coating of the cluster of the substance with CuI on both sides of the test strip 104 as opposed to the former method, which will only have the luminescent cluster compound present on the area of the test strip 104 the substance was applied to. The test strip 104 may be allowed to dry and then placed in the fluorimeter 102 of the portable spectrometer 100 to be analyzed.

Figure 4:
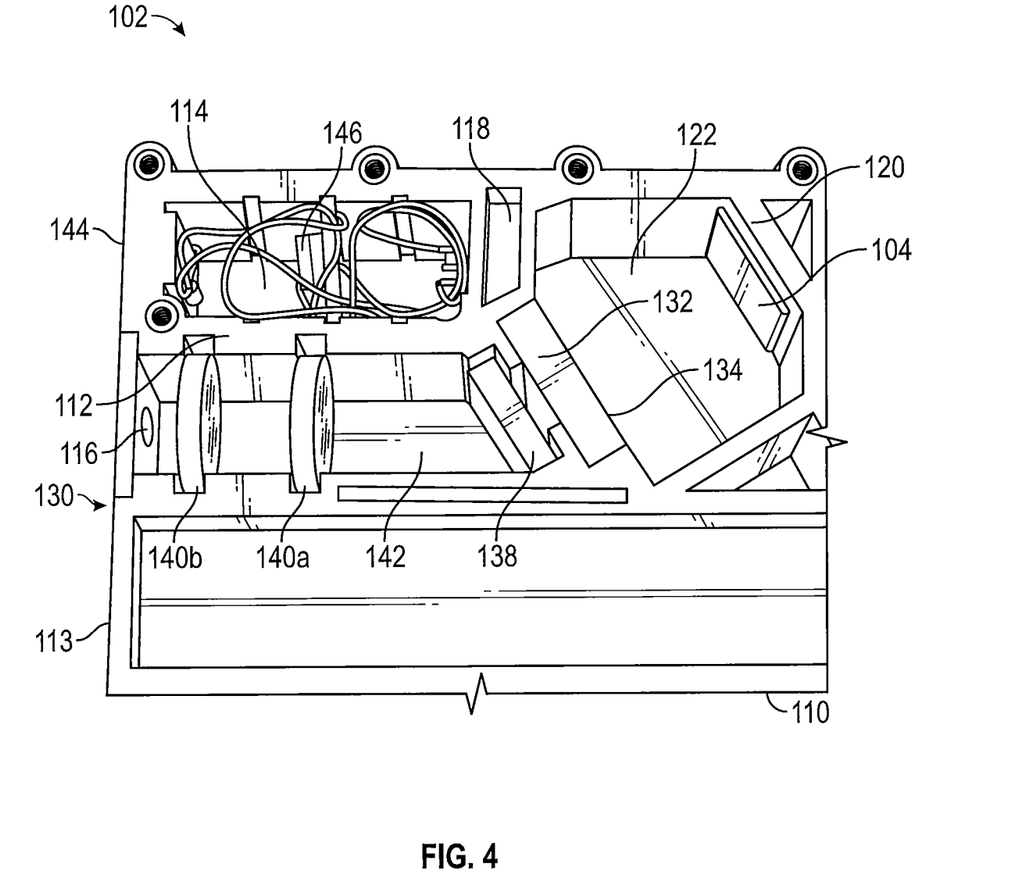
FIG. 4 is a pictorial representation of a part of a fluorimeter constructed in accordance with the presently disclosed inventive concepts.

FIG. 4 is a pictorial representation of a part of a fluorimeter 102 constructed in accordance with the presently disclosed inventive concepts. The fluorimeter 102 comprises a housing 110 having a plurality of interconnected walls 112 at least partially surrounding a cavity 114, where at least one of the walls 113 has an opening 116. In one embodiment, the housing 110 is of a small size such that the fluorimeter 102 is easily portable. In a nonexclusive example, the housing 110 has outer dimensions of 7.0 cm length, by 5.3 cm width, by 3.2 cm height. The interconnected walls 112 are preferably made of a material that is opaque to ambient light, and also preferably completely surround the cavity 114 so as to prevent the occurrence of unwanted light from interfering with the sample or adding noise to the emission spectrum generated by the fluorimeter 102. The fluorimeter 102 also includes a light source 118 positioned in the cavity 114 and adapted to emit light having a path. In one embodiment, the light source 118 is a light emitting diode (LED) excitation source that emits at 254 nm. A power source (not shown), such as one or more batteries, may also be included in the housing 110 for providing electrical power to the light source 118 as well as other electronic circuitry utilized to drive the light source 118. The housing 110 can be constructed using any suitable technique, such as three-dimensional printing.

The fluorimeter 102 also includes a support 120 for receiving the test strip 104 having the sample to be analyzed. The support 120 may be located within the path of the light such that the light contacts the sample to cause an emission from the fluorescent indicator on the test strip 104 in combination with the sample. The support 120 may be located within a reaction cavity 122 of the housing 110.

The fluorimeter 102 may also include an optical spectrum separation assembly 130 positioned to receive the emission from the fluorescent indicator located at the support 120 in the reaction cavity, separate the emission into an emission spectrum, and direct the separated emission spectrum through the opening 116. In one embodiment, the spectrum separation assembly 130 may include an optical guide 132 within the cavity 114 in the path of the light and constructed of a material that is opaque to the light. The optical guide 132 may have a slit, e.g., an air slit 134 in the path of the light that passes a portion of the light.

Figure 5:
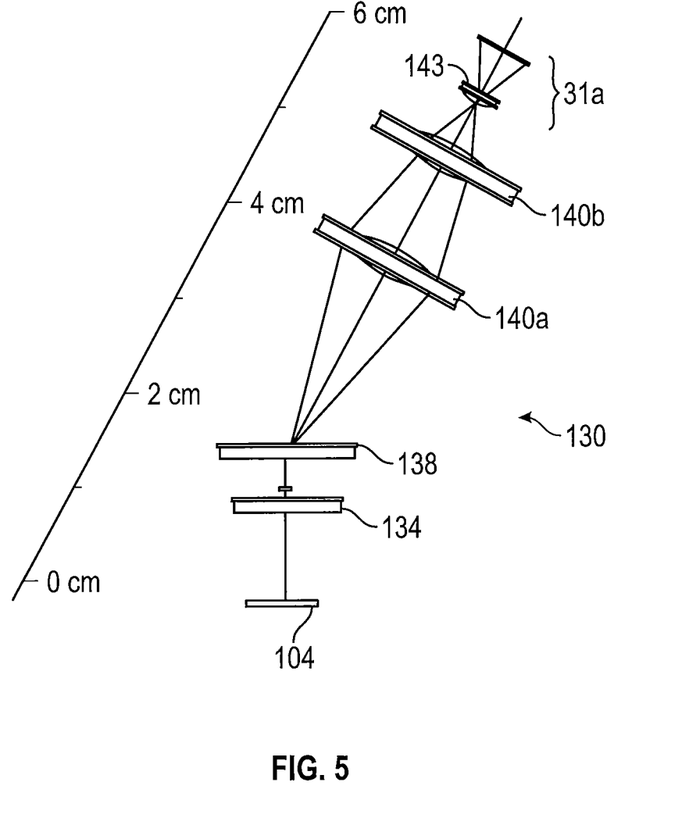
FIG. 5 is a diagrammatic representation of a path through which an emission is separated into its emission spectra and guided to an optical sensor in accordance with the presently disclosed inventive concepts.

In one embodiment, the optical spectrum separation assembly 130 comprises one or more diffraction grating 138 in the path of the light following the optical guide 132. The spectrum separation assembly 130 may also include one or more lenses 140 (illustrated, for example, as 140*a* and 140*b* in FIGS. 4-6) located in an emission channel 142. For example, FIG. 5 is a diagrammatic representation of an exemplary path and spectrum separation assembly 130 through which an emission is separated into its emission spectra and guided to an optical sensor 31*a* in accordance with the presently disclosed inventive concepts. In FIG. 5, the luminescence emitted from the test strip 104 travels through the air slit 134 then through the diffraction grating 138 which diffracts the light through a first lens 140*a* and a second lens 140*b* and then to an optical lens 143 of the optical sensor 31*a* of the mobile computing device 44 (illustrated, for example, in FIG. 1 as 44*a*-44*d* and as 44*b* in FIG. 2) that focuses the luminescence onto the optical sensor 31*a*.

Returning now to FIG. 4, in one embodiment, the fluorimeter 102 may also include a switch 144 located on a wall 112, for example in one embodiment wall 113, for sensing a presence of the mobile computing device 44 on the wall 112. The switch 144 may be operably connected to the light source 118 for enabling the light source 118 to emit light responsive to the presence of the mobile computing device 44 on the wall 112. The switch 144 may be operably connected to the light source 118 with a circuit 146. As stated above, It should be recognized by a person of ordinary skill in the art that the mobile computing device should not be limited to a cellular telephone and instead can apply to any mobile computing device comprising an optical sensor 31 and a processor, e.g., a laptop computer 44*a*, PDA 44*c*, or a tablet computer 44*d* as illustrated in FIG. 1.

Figure 6:
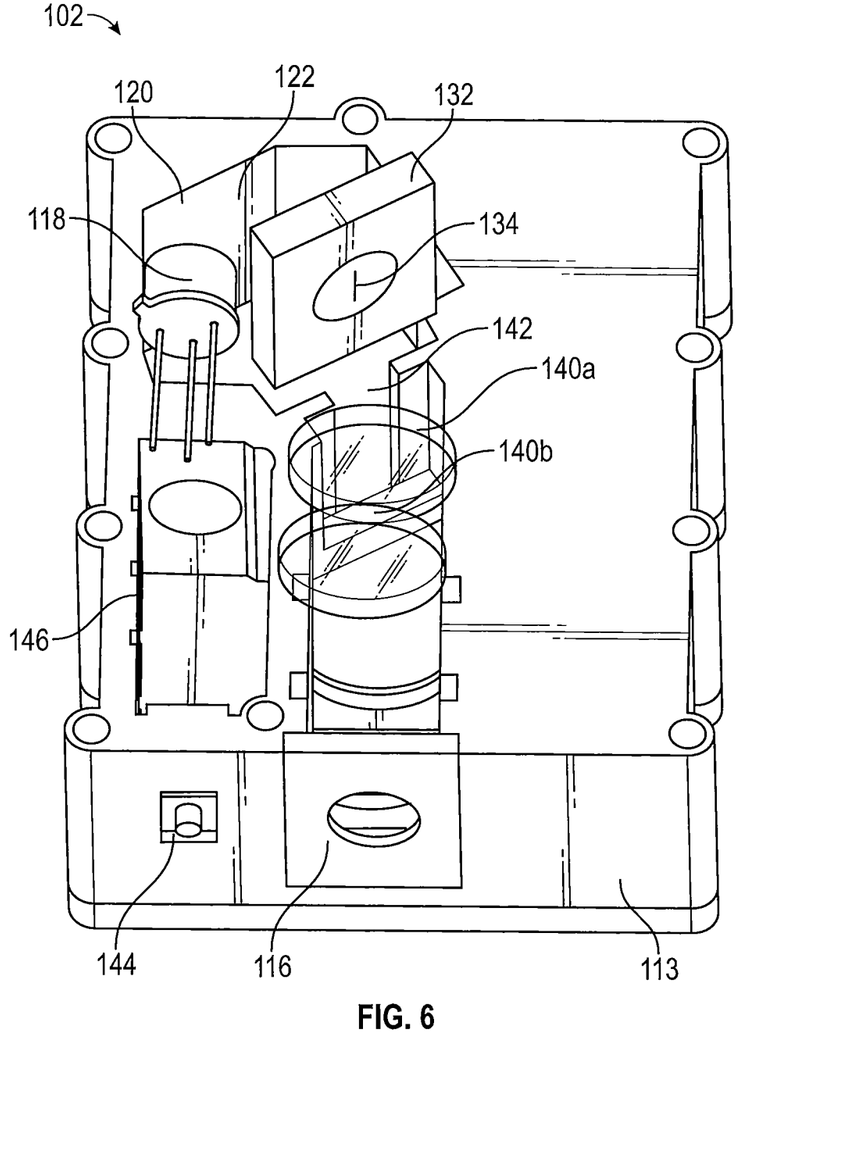
FIG. 6 is a diagrammatic representation of a partially exploded view of the components forming the fluorimeter in accordance with the presently disclosed inventive concepts.

FIG. 6 is a diagrammatic representation of a partially exploded view of the components forming the fluorimeter 102 in accordance with the presently disclosed inventive concepts. In the exemplary embodiment shown, the light source 118 is an LED capable of emitting at 254 nm, which is enabled and disabled via the circuit 146 connected to the switch 144 in the wall 113. Enabling the light source 118 causes the light source 118 to irradiate light, for example, light of 254 nm, onto the test strip 104 (not shown in FIG. 6) on the support 120 in the reaction cavity 122. The substance on the test strip 104 (not shown in FIG. 6) emits luminescence of a certain range of wavelengths, depending on the identity and nature of the substance. Here, the emitting luminescence then passes through an optical guide 132 and air slit 134 and a diffraction grating 138 (not shown in FIG. 6) then through two lenses 140*a*, 140*b* via the emission channel 142 to reach the opening 116 (exit window) in the wall 113.

Referring back to FIG. 2 and the spectrometer 100 shown therein in view of the illustrations depicted in FIGS. 4 and 6, the mobile computing device 44 (e.g., illustrated as a cellular telephone 44*b* in FIG. 2) may be positioned adjacent to the fluorimeter 102 such that the optical sensor 31, such as a camera, of the mobile computing device 44 is aligned with the opening 116 in the wall 113 of the fluorimeter 102. Pressing the mobile computing device against the switch 144 in the wall 113 of the fluorimeter 102 activates the switch 144 to cause the light source 118 to irradiate light. The camera of the mobile computing device 44 may act as a detector for the portable spectrometer 100, forming an image from the light emitted from the fluorimeter 102. The processor of the mobile computing device 44 may execute instructions to analyze the image to determine an identity of the unknown substance by comparing pixel values representative of emission spectra within the image to a library of emission spectra of known substances. Again, a person of ordinary skill in the art will recognize that the mobile computing device should not be limited to a cellular telephone and instead can apply to any mobile computing device comprising an optical sensor 31 and a processor, e.g., a laptop computer 44*a*, PDA 44*c*, or a tablet computer 44*d* as illustrated in FIG. 1.

The instructions may be in the form of software such as a smart phone application. The library of emission spectra may be stored within the mobile computing device 44 (illustrated as 44*a*-44*d* in FIGS. 1 and 44*b* in FIG. 2) and/or stored remotely, such as in the remote servers 18, and accessed via the network 16 of the portable spectrometer system 10.

Figure 7:
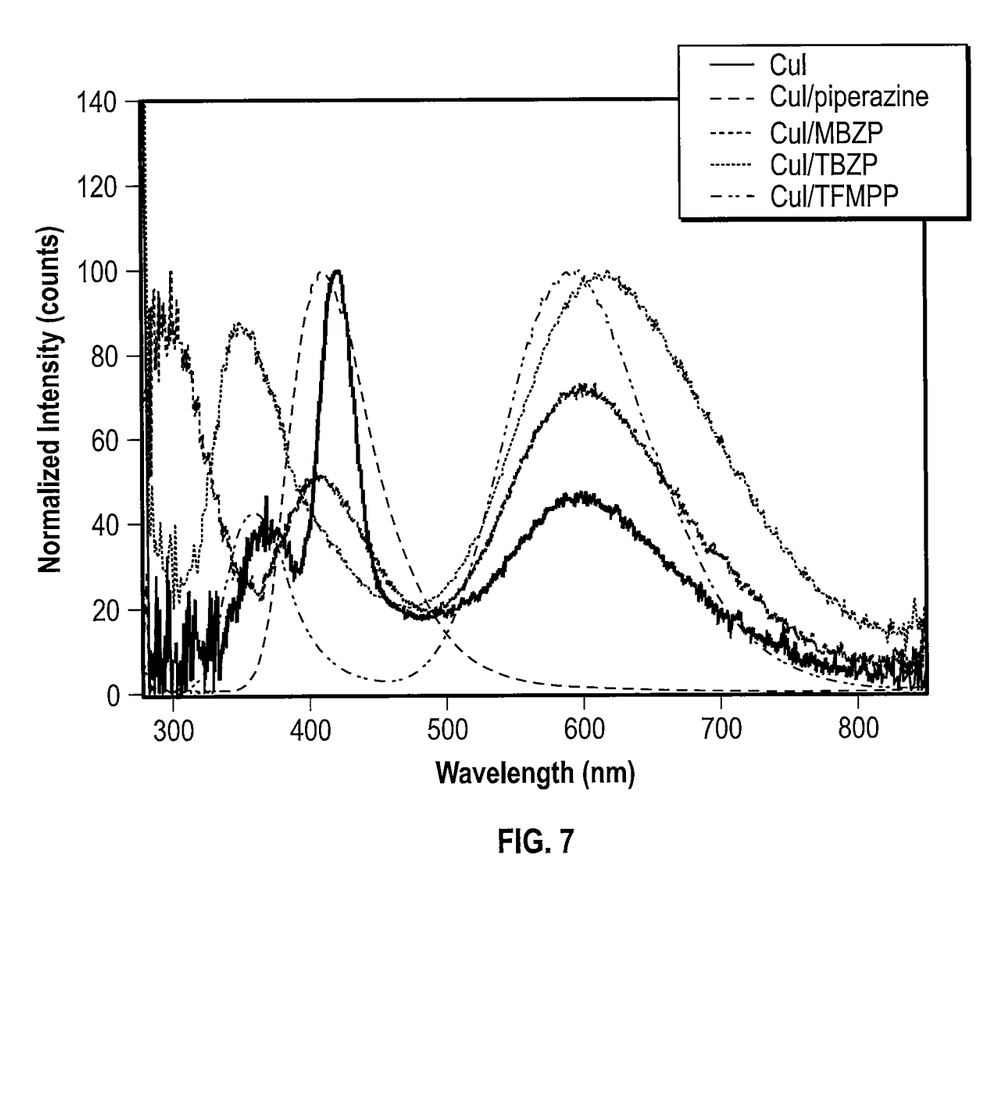
FIG. 7 is an exemplary graph of comparisons of resulting spectra of exemplary compounds in accordance with the present disclosure.

The resulting emission spectral data of a sample of an unknown substance on the test strip 104 can be used to presumptively identify substances of abuse. For example, FIG. 7 is a graph of the resulting spectra of some compounds—specifically, CuI-piperazine derivatives in FIG. 7. Note the characteristics of the emission peaks of the cluster compounds (CuI/substance) compared to the respective peaks of CuI and the substance. In the case of compounds with similar structures, such as piperazine and its derivatives as shown in FIG. 7, the cluster compounds formed with CuI luminesces at different wavelengths. This shows that these cluster compounds can result in spectral data that differs enough to be distinguished from one another, accounting for the minor change in chemical structure by displaying a large enough red or blue shift of similar peaks between compounds or different peaks all together.

Figure 8:
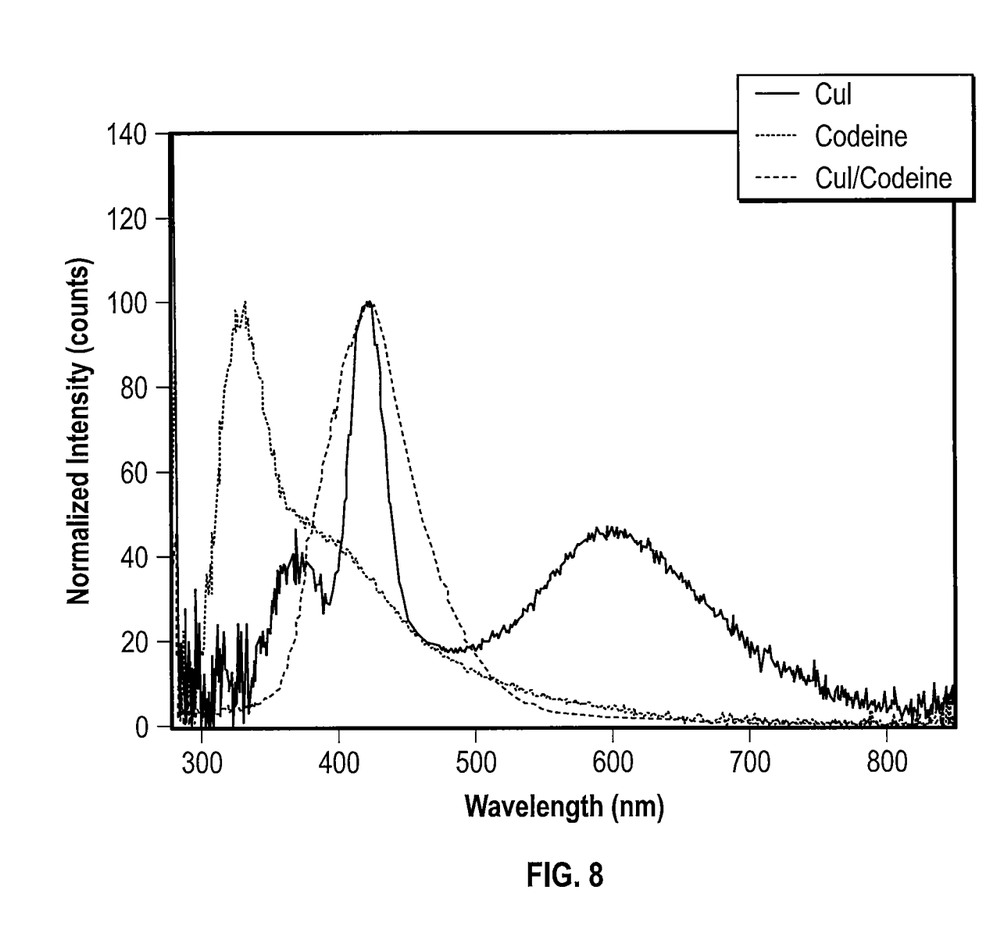
FIG. 8 is an exemplary graph of sample data from codeine (an opiate) on a test strip in accordance with the present disclosure.
Figure 9:
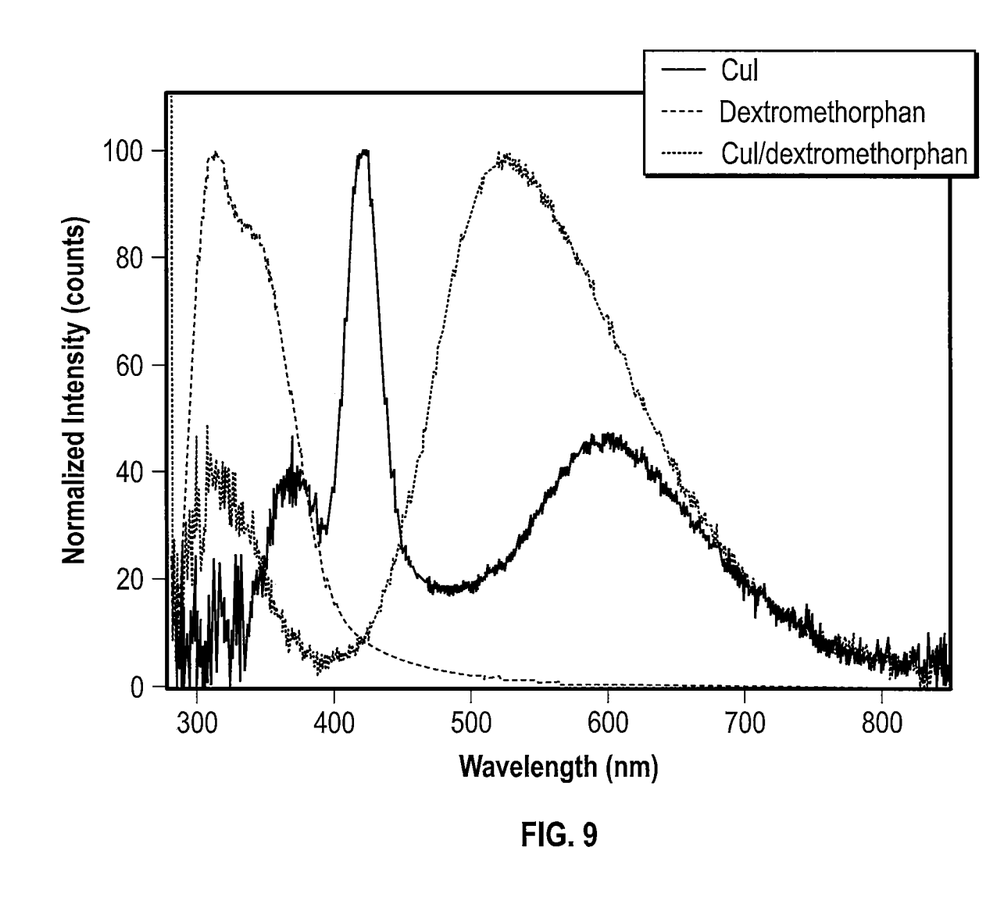
FIG. 9 is an exemplary graph of sample data from dextromethorphan (an alkaloid) on a test strip in accordance with the present disclosure.

Some substances of abuse were tested using the portable spectrometer system 10. For example, shown in FIGS. 8 and 9 are graphs of sample data for codeine (an opiate) and dextromethorphan (an alkaloid), respectively. Spectral data of medications and recreational drugs can be obtained over time to create a library database that can be used by officers and agents.

It should be understood that this approach is not limited to the identification of substances of abuse. It can also be used to identify the quality of petroleum products from new wells, the identity of biological stains (such as semen or urine), the identification of explosives, and any other application where a unique fluorescence signal can be measured.

CONCLUSION

The forensics community is in need of a more reliable and convenient test for on-site drug testing. Current methods such as Marquis' reagent and cobalt thiocyanate can yield many false positives and negatives and a portable GC-MS instrument requires proper training and is too expensive for every field officer or agent to have one. The portable spectrometer described herein is relatively inexpensive, easy to use, is compatible with smart phones, and yields more reliable results based on the luminescence spectra of $d^{10}$ metal cluster compounds with the drug itself as the ligands. Prior research has shown that the presently disclosed method of testing, especially when using copper(I) iodide, will yield a luminescent cluster compound with amines that emits in the visible spectrum range. The emission spectral profiles for each drug with different $d^{10}$ metal salts can be used to presumptively identify an unknown substance if it is an alkaloid, opiate, or some other amine compound.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed:

1. A portable spectrometer system, comprising:
    a fluorimeter comprising:
        a housing having a plurality of interconnected walls at least partially surrounding a cavity, at least one of the interconnected walls being an exterior wall;
        a light source positioned in the cavity and adapted to emit light having a path;
        a support for receiving a test surface having a sample to be analyzed, the support located within the path of the light such that the light contacts the sample to cause an emission from a fluorescent indicator located at the support; and
        an optical spectrum separation assembly positioned to: receive the emission from the fluorescent indicator, separate the emission into an emission spectrum having a path, and direct the separated emission spectrum through an opening disposed on the exterior wall, the opening located within the path of the separated emission spectrum;
    a mobile computing device comprising:
        an optical sensor positioned to receive the separated emission spectrum passing through the opening and to generate an image indicative of the separated emission spectrum; and
        a processor having instructions to analyze the image to determine the identity of an unknown substance within the sample.

2. The portable spectrometer system of claim 1, further comprising a library containing spectral data comprising a plurality of unique fluorescent signals corresponding to a plurality of compounds.

3. The portable spectrometer system of claim 2, wherein the processor analyzes the image by comparing pixel values representative of emission spectrum of the sample to entries in the library to determine the identity of the unknown substance within the sample.

4. The portable spectrometer system of claim 2, wherein the library can be stored on the mobile computing device, or hosted remotely by a remote host system that the mobile computing device accesses.

5. The portable spectrometer system of claim 2, wherein the plurality of compounds are chosen from illicit drugs, substances of abuse, medications, petroleum products, explosives, and combinations thereof.

6. The portable spectrometer system of claim 1, further comprising a test surface having the fluorescent indicator and adapted to receive the sample to be analyzed, wherein the test surface having the fluorescent indicator comprises a product of coating at least a portion of a substrate with a solution comprising the fluorescent indicator and a solvent.

7. The portable spectrometer system of claim 6, wherein the test surface further comprises a polymer selected from the group consisting of polyvinylpyrrolidone, polyvinyl alcohol, and combinations thereof.

8. The portable spectrometer system of claim 6, wherein the fluorescent indicator is a compound comprising a metal with an electronic configuration of $d^{10}$ and at least one anion chosen from group 17 elements, cyanide ($CN^-$), thiocyanate ($SCN^-$), and combinations thereof.

9. The portable spectrometer system of claim 1, wherein the unknown substance within the sample comprises at least one substance having a unique fluorescent signal that can be measured and that is chosen from an illicit substance, a substance of abuse, a medication, a petroleum product, an explosive, and combinations thereof.

10. The portable spectrometer system of claim 1, wherein the unknown substance to be analyzed comprises an amine group.

11. The portable spectrometer system of claim 1, wherein the optical sensor is a camera.

12. The portable spectrometer system of claim 1, wherein the light source is a light emitting diode or a flash lamp on a camera of the mobile computing device.

13. A method of analyzing a sample using the portable spectrometer system of claim 1, comprising the steps of:
    contacting the test surface with the sample of the unknown substance; and using the fluorimeter and mobile computing device to analyze and identify the unknown substance within the sample.

14. The method of claim 13, wherein the step of contacting the test surface with the sample comprises:
    contacting the sample of the unknown substance on the test surface; and
    adding a solvent to the sample of the unknown substance and the test surface.

15. The method of claim 13, wherein the step of contacting the test surface with the sample comprises:
    contacting the sample of the unknown substance with a pre-wetted test surface.

16. The method of claim 13, wherein the step of contacting the test surface with the sample comprises coating the test surface in a solution comprising the sample and a solvent.

17. The method of claim 13, wherein the test surface contacted with the sample is allowed to completely dry prior to the step of using the fluorimeter and mobile computing device.

18. The method of claim 13, wherein the step of contacting the test surface with the sample produces a luminescent cluster compound in an area of contact between the sample and the test surface when the sample comprises an amine group.

19. The method of claim 18, wherein the luminescent cluster compound is stimulated by UV radiation in the step of using the fluorimeter allowing the mobile computing device to analyze and identify the unknown substance in the sample.

20. The method of claim 13, wherein the unknown substance within the sample comprises at least one substance having a unique fluorescent signal that can be measured and that is chosen from an illicit substance, a substance of abuse, a medication, a petroleum product, an explosive, and combinations thereof.

* * * * *